(12) United States Patent
Rabe

(10) Patent No.: US 6,234,390 B1
(45) Date of Patent: May 22, 2001

(54) PROCESS FOR ACQUIRING AND/OR PAYING A FEE FOR EXHAUST POLLUTANTS AND A MOTOR VEHICLE WITH AN EXHAUST POLLUTANT SET WHICH OPERATES USING THIS PROCESS

(75) Inventor: Jürgen Rabe, Höchstadt (DE)

(73) Assignee: Sachsenring Automobiltechnick AG, Zwickau (DE)

( * ) Notice: Subject to any disclaimer, the term of this patent is extended or adjusted under 35 U.S.C. 154(b) by 0 days.

(21) Appl. No.: 09/230,470

(22) PCT Filed: Jul. 21, 1997

(86) PCT No.: PCT/DE97/01525

§ 371 Date: Jan. 26, 1999

§ 102(e) Date: Jan. 26, 1999

(87) PCT Pub. No.: WO98/05005

PCT Pub. Date: Feb. 5, 1998

(30) Foreign Application Priority Data

Jul. 26, 1996 (DE) .............................................. 190 30 092

(51) Int. Cl.[7] .................................................. G07B 15/02
(52) U.S. Cl. ............................................................. 235/384
(58) Field of Search ..................................... 235/384, 380, 235/381; 902/24

(56) References Cited

U.S. PATENT DOCUMENTS

| | | | |
|---|---|---|---|
| 3,961,231 | * 6/1976 | Gillespie | 317/139 |
| 4,733,358 | 3/1988 | Joerg et al. | 364/431.05 |
| 5,343,906 | * 9/1994 | Tibbals, III | 141/83 |
| 5,657,233 | * 8/1997 | Cherrington et al. | 705/400 |
| 5,936,221 | * 8/1999 | Corder et al. | 235/380 |
| 6,061,668 | * 5/2000 | Sharrow | 235/381 |

FOREIGN PATENT DOCUMENTS

| | | |
|---|---|---|
| 34 38 172 | 4/1986 | (DE) . |
| 35 25 671 | 12/1986 | (DE) . |
| 40 05 803 | 8/1990 | (DE) . |
| 39 27 994 | 2/1991 | (DE) . |
| 42 36 107 | 5/1994 | (DE) . |
| 43 04 838 | 8/1994 | (DE) . |
| 296 03 143 U | 4/1996 | (DE) . |
| 295 04 088 U | 7/1996 | (DE) . |
| WO 90 15401 | 12/1990 | (WO) . |

* cited by examiner

Primary Examiner—Thien M. Le
Assistant Examiner—Daniel St. Cyr
(74) Attorney, Agent, or Firm—Nixon Peabody LLP; David S. Safran

(57) ABSTRACT

A process is disclosed for determining and/or paying a compensation for pollutants in the exhaust fumes of a combustion unit (1). The pollutants in the exhaust fumes are determined by at least one sensor (4) and an amount of monetary unit which corresponds to the pollutant emission is debited from a chip card (9) by a computer (7) and a chip card reader (8).

18 Claims, 1 Drawing Sheet

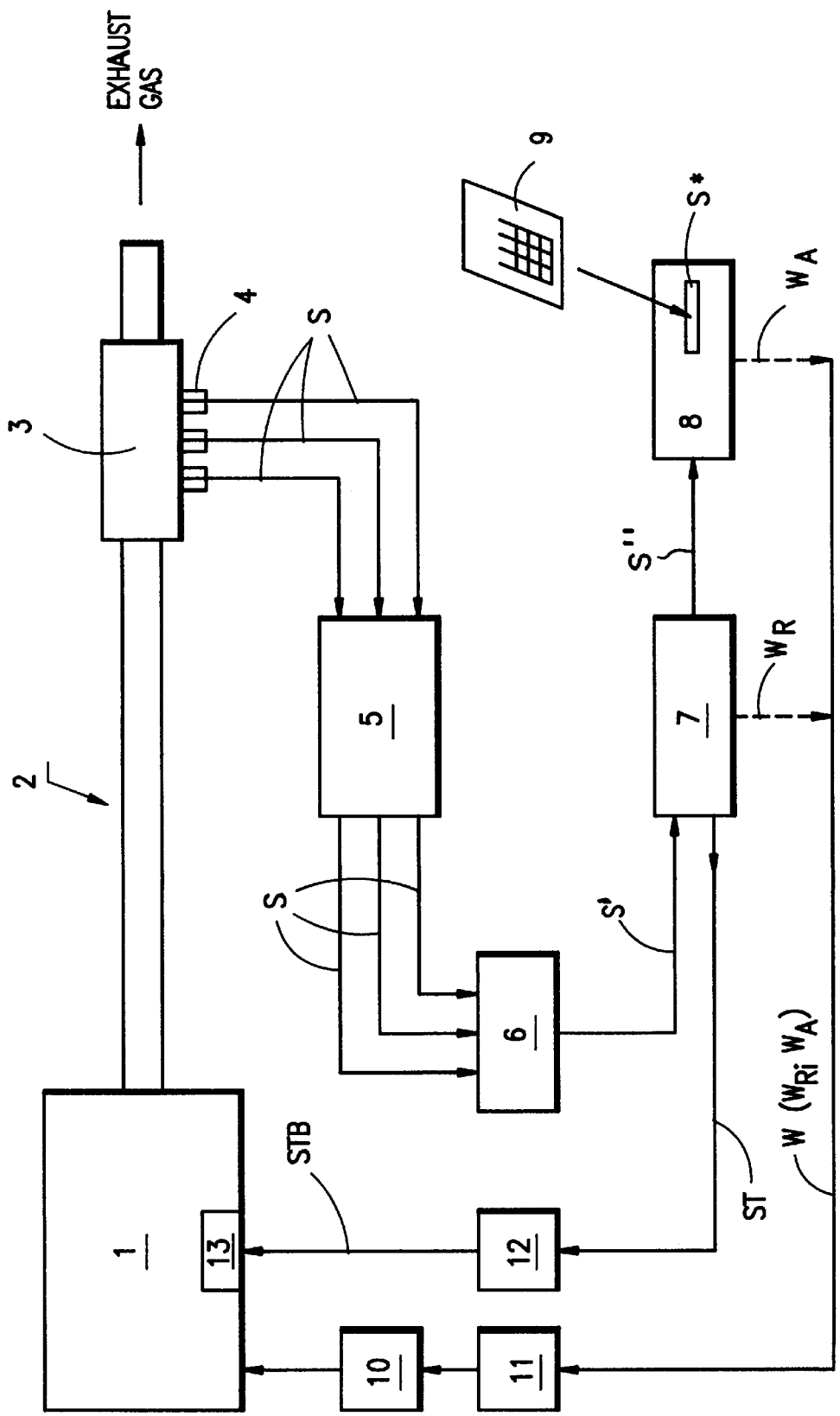

PROCESS FOR ACQUIRING AND/OR PAYING A FEE FOR EXHAUST POLLUTANTS AND A MOTOR VEHICLE WITH AN EXHAUST POLLUTANT SET WHICH OPERATES USING THIS PROCESS

TECHNICAL FIELD

This invention relates to a process for acquiring and/or paying a fee for pollutants in the exhaust of a combustion unit provided with a starting system and an exhaust channel, especially an internal combustion engine and a motor vehicle with an exhaust pollutant set which operates using this process.

BACKGROUND OF THE INVENTION

A conventional process and a motor vehicle with a means for executing the process are known from DE 40 05 803 A1. In this design, motor vehicle performance data filed in a memory of an evaluation unit, especially with respect to exhaust data, are compared to the values which actually occur in different operating states. Deviations in the direction of unallowable values are indicated by increasing a counting pulse rate. There is an officially approved evaluation unit. The latter has a memory which can be loaded by means of a mobile counting medium which is charged with monetary units, for example a magnetic or chip card. The stored amount of monetary units is reduced by the counting pulses which occur. Payment of an advance tax by charging the magnetic or chip card and transfer of the charged amount into the memory of the debiting unit are the prerequisite for the motor vehicle operator's license. The status of the memory or the account is publicly displayed on a display. Therefore the operator's license to be derived from the account status can be read at anytime from the outside and can be evaluated accordingly by the authorities. The motor vehicle can be used at any time by the card holder when the memory is charged, but also by any third party. Therefore, in the case of theft, it can also be used without permission by a thief, a fence, rowdies or the like. These individuals generally do not pay much attention to overly high exhaust content or overly high pollutant values, thus negating the object of evaluation.

It is known from international application WO 90/15401 published on Dec 13, 1990 that, to eliminate or reduce unpleasant traffic situations, such as traffic jams on roads or lots, for example parking lots, for example by reducing the amount of time necessary to traverse a given distance, by adhering to a stipulated average speed or by recording the number of times the motor vehicle stops, a certain amount is demanded of drivers when they are driving into these zones.

To encourage drivers to avoid these zones or to leave these zones as quickly as possible, it is proposed that amounts corresponding to conditions be debited from a chip card charged with a certain amount of money in these zones. Although it would be a good idea, for example, in congested areas, to incorporate exhaust emissions in a suitable manner, there is no information thereon.

Furthermore it is known from DE 35 25 671 A1 that when a certain maximum speed is exceeded, a corresponding fine is debited from a chip card charged with monetary units. To do this, speeding can be automatically checked. However there is no linkage to an exhaust emission here either.

It has already been suggested that a so-called eco-tax be levied for exhaust pollutants in combustion units, especially in internal combustion engines. In this connection matching the motor vehicle tax to the pollutant discharge of the vehicle is considered.

It is known on the other hand that telephone charges can be debited via chip cards charged with monetary units. Chip cards of banks, warehouses or the like are known via which the amount of money corresponding to a target, bill or the like can be debited, not from the chip card itself, but from the account of the chip card holder.

SUMMARY OF THE INVENTION

The object of this invention, which is not known from the prior art and which is therefore new, is to prevent misuse of a combustion unit which emits pollutants.

This object is achieved by a process for at least one of acquiring and paying a fee for pollutants in the exhaust of a combustion unit provided with a start system and an exhaust channel, especially of an internal combustion engine, there being at least one pollutant sensor in the exhaust channel which produces, via a converter, an electrical signal, the signal being sent to a detector unit which outputs the signal to a computer in a form which can be processed as a control signal, and the computer makes available a value signal (S") at an output which corresponds to the determined pollutant content, the value signal is formed from the control signal and is sent to a debiting unit which makes available a debiting signal by which the amount corresponding to the respective pollutant content is debited from a memory, the memory can be filled with monetary units by a chip card which is charged with monetary units via a chip card reader, the process comprising the steps of: providing the chip card capable of being charged with monetary units; inserting the chip card into the chip card reader, the chip card remaining in the reader during operation of the internal combustion engine for use as the memory; debiting from the chip card an amount of monetary units corresponding to the respective instantaneous pollutant content; generating and transmitting at least one warning signal by at least one of the computer and the debiting unit; said at least one warning signal corresponding to one of an amount of monetary units below a lower boundary value and an amount which is not present on the chip card; inputting said warning signal into a control unit provided with said combustion unit; preventing starting of one of the combustion unit and the motor vehicle based upon the presence of one of the insertion of the chip and being incomplete, the insertion of the chip card being complete but the chip card being uncharged, and an insufficient quantity of remaining monetary units on the chip card.

The object is also achieved by a motor vehicle with an internal combustion engine and an exhaust system connected thereto, comprising: at least one pollutant sensor located in an exhaust stream of the exhaust system, said at least one pollutant sensor adapted to react to the pollutants contained in the exhaust and output a signal which corresponds to an amount of discharged pollutant, further including a debiting unit via which an amount of monetary units corresponding to the value signal can be debited from a memory which can be charged via a chip card, wherein a chip card reader is assigned to the debiting unit, wherein the memory is directly on the chip card and the memory is chargeable with the monetary units, and wherein the debiting unit is adapted to continuously debit monetary units from the chip card during operation of the internal combustion engine according to the instantaneous pollutant content.

Using the invention, for example the operator's license is not revoked or a fine levied, as in the past, but starting of the combustion unit is prevented when there is no chip card or when the chip card is empty or has too few monetary units. In this way misuse of the combustion units which emit polluting exhausts is reliably prevented by preventing these combustion units from starting. For example this combustion unit cannot be started without the chip card in case of theft either. In addition, the emission of exhaust of any combustion units can be easily charged with a predetermined fee without additional accounting costs, administrative costs or the like. Also the users or operators are furthermore encouraged to behave economically. For example, drivers of motor vehicles are encouraged not to drive at full speed or to stop the engine when stopped for longer periods of time in city traffic or in traffic jams.

Other advantageous details of the invention are given in the dependent claims and are detailed in the following using a process diagram illustrated in the drawings.

DETAILED DESCRIPTION OF THE INVENTION

The combustion unit, for example a power plant, a garbage incineration plant, an internal combustion engine, or the like is labelled 1. When internal combustion engines are used, they can be gasoline or diesel engines or fuel or gas turbines or Stirling engines. Gas operation includes use of natural gas and also other gases such as butane, propane or hydrogen as the fuel.

In the exhaust system 2 of the combustion unit 1 and specifically in the exhaust channel, for example in an exhaust cooler or muffler 3, at least one pollutant sensor 4 is attached which reacts to the pollutants in the exhaust. It can be, for example, a pollutant sensor 4 which responds to all pollutants to be especially acquired, for example, carbon oxides ($CO_x$), nitrous gases ($NO_x$), sulfur oxides ($SO_x$), hydrocarbons (KW), such as benzene, gasoline, methanol, or the like, and delivers a signal S which corresponds to the pollutant content. The signal S is available from the sensors conventionally used for this purpose generally as an electrical signal, for example, in the form of a voltage or a current. However chemical-based sensors are known. Their signal is then converted into an electrical signal S in a converter 5. It can be advantageous to provide several pollutant sensors 4, from which one sensor at a time detects only a single pollutant or a range from the total content of the pollutants contained in the exhaust.

The signal S acquired directly or via the converter 5 is input into a detector unit 6 in which the signal S as necessary is converted into a control signal S' of a form such that it is input into a computer 7 and can be processed by it. For example, the control signal S' is converted into pulses and/or pulse sequences of a size corresponding to the pollutant content and is output in digital form. The converter 5 can already be contained in the computer 7 or integrated there. The computer 7 is programmed such that it makes available a value signal S" from the control signal S' according to a fixed assessment rate or fixed fee unit for a defined amount of pollutants at its output. The value signal S" is input into a debiting unit 8 which operates in the manner of a chip card reader. This chip card reader therefore reads out, via its conventionally present read contacts or detectors which are not shown in the drawings, the monetary units stored in an inserted chip card 9, for example optically and/or magnetically, and generates a debiting signal S* by which the monetary amount, which corresponds to the measured pollutant content, is debited from the chip card 9.

In this way, for example, for a motor vehicle, the monetary units which correspond to the pollutant emission, and also approximately to the corresponding kilometers driven, can be debited directly as a tax.

According to one development of the invention, it is provided that when there are no monetary units or an insufficient number stored on the chip card 9 or when a stipulated lower boundary value is reached or not reached, the computer 7 and/or the debiting unit 8 outputs at least one warning signal W, for example $W_R$ or $W_A$. This warning signal W is intended to remind the operator that his chip card 9 must be charged. For example, when a warning signal occurs, 10 km to 50 km can still be driven in order to be able, for example, to reach the next filling station or chip charging location.

It is especially advantageous to assign a control unit 11 to the combustion unit 1 for its starting system 10 which is conventionally present. The warning signal W, $W_R$, $W_A$ can be input into the control unit 11. Depending on the remaining monetary units present on the chip card 9, the combustion phase of the combustion unit, for example the running time of an internal combustion engine, can be limited via the control unit 11 and/or restart prevented after stopping the combustion process. In particular, starting is prevented when the chip card 9 is not inserted or a chip card 9 on which there are insufficient or no monetary units stored is inserted.

The control unit 11 can also be part of the computer 7 or the debiting unit 8 or can be implemented by it.

According to another advantageous embodiment of the invention, depending on the remaining monetary units present on the chip card 9 or for a chip card 9 which has not been inserted or which has been inserted but which is not charged, another warning signal $W_R$ or $W_A$ is output. The warning signals $W_x$ can be output as audio signals, for example via a loudspeaker or piezobeeper and/or as optical signals, for example via a display or a screen.

The individual components of the possibly necessary converter 5, detection unit 6, computer 7, debiting unit 8 and assigned pollutant sensor(s) 4 are advantageously combined into a commercial unit or a commercial set. In this way, the entire debiting system can be easily permanently installed directly in the object for all operators of combustion units 1. For example, the debiting system can be permanently installed in a motor vehicle so that all motor vehicles equipped with it can be automatically taxed.

The sensors(s) 4 are preferably installed in the exhaust channel or in the muffler 3 of exhaust systems 2 or they can be attached to these parts from the outside and can project with the sensing part into the exhaust channel or into the muffler 3.

Generally, preferably, sensors, especially based on metal oxides, semiconductors, etc. are used since this yields small units. In large designs, it is also possible to acquire and evaluate the exhaust pollutants by means of gas chromatography devices instead of using semiconductor sensors.

The process of the present invention is preferably used in motor vehicles with internal combustion engines and an exhaust system connected thereto as the exhaust-pollutant set.

Here there is at least one pollutant sensor 4 which is located in the exhaust stream of the exhaust system 2, which reacts to the pollutants contained in the exhaust, and which delivers a signal S which corresponds to the amount of pollutant discharged. There is furthermore a computer 7 which processes the signal S output by the pollutant sensor 4 and delivers a value signal S" which corresponds to the pollutant content. Finally, there is a debiting unit 8 which is made as a chip card reader and via which an amount of monetary units which corresponds to the value signal S" can be debited from an inserted chip card 9 which is charged with monetary units.

In a further development of this motor vehicle, there is a sound generator and/or optical display via which at least an audio or visible signal can be output when the chip card 9 is not inserted or when inserted chip card 9 is not charged or is inadequately charged with monetary units.

Finally, the arrangement can also be made such that the starting signal of the motor vehicle can be controlled via the computer 7 and/or the debiting unit 8 such that, for a chip card 9 which is not inserted or a chip card 9 which is inserted but on which there are insufficient or no monetary units stored, starting or restarting of the motor vehicle is not possible.

According to one advantageous development of the invention, a control signal ST for emission value control is output from the signals S made available by the sensors 4 via the computer 7 and is sent to a control unit 12. The control unit 12 delivers control commands STB to the device(s) or unit(s) which is or are assigned to the combustion unit 1 and which execute fuel mixture preparation or composition for the combustion unit 1. These devices or units 13 are for example carburetors, injection devices, air supply control units, ignition time adjustment units or the like. Via the computer 7, the mixture composition is set or controlled to the allowable values stored in the computer 7 or controlled in such a way that the exhaust emission values are optimized or assume optimum values or the lowest emission values are obtained.

Advantageously, control can take place such that the sum of the pollutant emission values reaches a value which is harmless or the least harmful, or tolerable or most tolerable and which is justifiable for protecting the environment.

According to one advantageous development of the invention, suitable sensors or measuring means can determine the fuel consumption, for example per debiting period and/or the number of kilometers, miles, etc. driven per debiting unit. These fuel consumption values can be optionally stored in a computer 7. These determined values or data signals derived therefrom or the like are used together with the emission value to compute the amount to be debited. In this way for example the way in which a driver of a motor vehicle drives or the efficiency of a motor vehicle or combustion unit can be incorporated into the calculation.

What is claimed is:

1. A process for at least one of acquiring and paying a fee for pollutants in the exhaust of a combustion unit provided with a start system and an exhaust channel, especially of an internal combustion engine, there being at least one pollutant sensor in the exhaust channel which produces, via a converter, an electrical signal, the signal being sent to a detector unit which outputs the signal to a computer in a form which can be processed as a control signal, and the computer makes available a value signal at an output which corresponds to the determined pollutant content, the value signal is formed from the control signal and is sent to a debiting unit which makes available a debiting signal by which the amount corresponding to the respective pollutant content is debited from a memory, the memory can be filled with monetary units by a chip card which is charged with monetary units via a chip card reader, the process comprising the steps of:

providing a chip card charged with monetary units;

inserting the chip card into the chip card reader, the chip card remains in the reader during operation of the internal combustion engine for use as the memory;

debiting from the chip card an amount of monetary units corresponding to the respective instantaneous pollutant content;

generating and transmitting at least one warning signal by at least one of the computer and the debiting unit, said at least one warning signal corresponding to one of an amount of monetary units below a lower boundary value and an amount which is not present on the chip card;

inputting said warning signal into a control unit provided with said combustion unit;

preventing starting of one of the combustion unit and a motor vehicle if the chip card is not completely inserted or the chip card is uncharged or has an insufficient quantity of remaining monetary units.

2. The process of claim 1, including the step of limiting a running time of the combustion unit depending on the remaining monetary units of the inserted chip card.

3. The process of claim 2, including the step of limiting the driving range of the motor vehicle depending on the remaining monetary units of the inserted chip card.

4. The process in claim 1, including the step of limiting the driving range of the motor vehicle depending on the remaining monetary units of the inserted chip card.

5. The process of claim 1, further including the step of outputting another warning signal depending on one of the remaining monetary units, the presence of an uncharged chip card and the presence of an incompletely inserted chip card.

6. The process of claim 5, wherein said another warning signal is output continuously.

7. The process of claim 1, wherein a commercial unit is formed from the converter, the detector unit, the computer, the debiting unit and at least one assignable pollutant sensor, said commercial unit being permanently installed on an internal combustion engine connected to the combustion unit.

8. The process of claim 1, wherein one pollutant sensor is used for all relevant pollutants.

9. The process of claim 1, wherein several pollutant sensors are used for one of different pollutants and pollutants proportions.

10. The process of claim 9, wherein one of a fuel mixture preparation and a mixture composition for the combustion unit is controlled via the computer from the signal made available by the at least one sensor such that one of optimized and minimum pollutant emission values in the exhaust are obtained.

11. The process of claim 1, wherein the pollutant sensors are attached to project into a muffler of the exhaust system of the combustion unit.

12. The process of claim 1, wherein the process is used in motor vehicles with one of an internal combustion engine and a gas turbine.

13. The process of claim 1, wherein one of a fuel mixture preparation and a mixture composition for the combustion unit is controlled via the computer from the signal made available by the at least one sensor such that one of optimized and minimum pollutant emission values in the exhaust are obtained.

14. The process of claim 1, wherein control takes place such that a sum of the pollutant emissions is controlled to a value which is at least one of harmless, least harmful, tolerable, and most tolerable, and which is justifiable for protecting the environment.

15. The process of claim 14, wherein in addition to determining the pollutant content, at least one of the fuel consumption and the number of kilometers driven per debiting period is determined and values corresponding thereto are used together with the value of the pollutant emission to compute the values to be debited.

16. A motor vehicle with an internal combustion engine and an exhaust system connected thereto, comprising: at least one pollutant sensor located in an exhaust stream of the exhaust system, said at least one pollutant sensor adapted to react to the pollutants contained in the exhaust and output a signal which corresponds to an amount of discharged pollutant, further including a debiting unit via which an amount of monetary units corresponding to the value signal can be debited from a memory which can be charged via a chip card, wherein a chip card reader is assigned to the debiting unit, wherein the memory is directly on the chip card and the memory is chargeable with the monetary units, and wherein the debiting unit is adapted to continuously debit monetary units from the chip card during operation of the internal combustion engine according to the instantaneous pollutant content at least one of a sound generator and an optical display via which at least one audio signal and visible signal can be delivered when one of the chip card is incompletely inserted, an inserted chip card is uncharged and the chip card is insufficiently charged with monetary units.

17. The motor vehicle of claim 16, further including a starting system for the motor vehicle controllable via at least one of a computer and the debiting unit such that starting and restarting of the motor vehicle is impossible when one of the chip card is incompletely inserted, an inserted chip card is uncharged and the chip card is insufficiently charged with monetary units.

18. The motor vehicle of claim 1, further including a starting system for the motor vehicle controllable via at least one of the computer and the debiting unit such that one of starting and restarting of the motor vehicle is impossible when one of the chip card is incompletely inserted, an inserted chip card is uncharged and the chip card is insufficiently charged with monetary units.

\* \* \* \* \*